US010739198B2

(12) United States Patent
Grueger et al.

(10) Patent No.: US 10,739,198 B2
(45) Date of Patent: *Aug. 11, 2020

(54) SYSTEM FOR ANALYZING ELECTROMAGNETIC RADIATION, AND DEVICE FOR PRODUCING SAME

(71) Applicant: Fraunhofer-Gesellschaft zur Foerderung der angewandten Forschung e.V., Munich (DE)

(72) Inventors: Heinrich Grueger, Dresden (DE); Jens Knobbe, Dresden (DE); Tino Puegner, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,496

(22) Filed: Dec. 12, 2017

(65) Prior Publication Data

US 2018/0172517 A1    Jun. 21, 2018

(30) Foreign Application Priority Data

Dec. 16, 2016   (DE) .................. 10 2016 225 344

(51) Int. Cl.
 *G01J 3/42*       (2006.01)
 *G01J 3/28*       (2006.01)
 (Continued)

(52) U.S. Cl.
 CPC ............. *G01J 3/42* (2013.01); *G01J 3/0208* (2013.01); *G01J 3/0218* (2013.01);
 (Continued)

(58) Field of Classification Search
 CPC ...... G01J 3/0259; G01J 3/2823; G01J 3/0208; G01J 3/0291; G01J 3/18; G01J 3/42;
 (Continued)

(56) References Cited

U.S. PATENT DOCUMENTS 4,468,122 A * 8/1984 Puryaev ............... G01B 11/255
 356/513
4,995,724 A * 2/1991 Sonobe ..................... G01J 3/28
 356/319

(Continued)

FOREIGN PATENT DOCUMENTS

DE    4434814 A1    4/1996
EP    3104147 A1    12/2016

*Primary Examiner* — Mohamed K Amara
(74) *Attorney, Agent, or Firm* — Michael A. Glenn; Perkins Coie LLP (57) ABSTRACT

A polychromator includes a substrate and a functional element having an optical spectral decomposition action. The functional element having an optical spectral decomposition action is configured to spectrally decompose electromagnetic radiation originating from an entry opening, e.g. light which originates from an optional radiation source and is reflected at a sample, so that a spectrally decomposed spectrum is obtained, and to image the spectrally decomposed spectrum onto a spatial area of the substrate. The substrate includes at least two transparent zones at different positions within the spatial area, so that two different spectral components of the spectrums are detectable at the two transparent zones.

30 Claims, 9 Drawing Sheets

(51) Int. Cl.
*G01J 3/02* (2006.01)
*G01J 3/18* (2006.01)
*G01J 3/36* (2006.01)
*G01N 21/25* (2006.01)
*G01N 21/31* (2006.01)
*G01J 3/12* (2006.01)

(52) U.S. Cl.
CPC ........... *G01J 3/0229* (2013.01); *G01J 3/0256* (2013.01); *G01J 3/0294* (2013.01); *G01J 3/18* (2013.01); *G01J 3/1804* (2013.01); *G01J 3/2803* (2013.01); *G01J 3/2823* (2013.01); *G01J 3/36* (2013.01); *G01N 21/255* (2013.01); *G01N 21/3103* (2013.01); *G01J 2003/1278* (2013.01); *G01J 2003/1286* (2013.01)

(58) Field of Classification Search
CPC ...... G01J 3/2803; G01J 3/0294; G01J 3/0256; G01J 3/0229; G01J 3/0218; G01J 3/1804; G01J 3/36; G01J 2003/1278; G01J 2003/1286; G01N 21/3103; G01N 21/255
See application file for complete search history.

(56) References Cited

U.S. PATENT DOCUMENTS

| | | | | |
|---|---|---|---|---|
| 4,997,281 A * | 3/1991 | Stark | ............... | G01J 3/2803 250/339.02 |
| 4,999,489 A * | 3/1991 | Huggins | ............ | G01D 5/34776 250/226 |
| 5,020,910 A * | 6/1991 | Dunn | ............... | G01J 3/0259 356/328 |
| 5,159,404 A * | 10/1992 | Bittner | .............. | G01J 3/0259 356/328 |
| 5,166,755 A * | 11/1992 | Gat | ............... | G01J 3/02 250/226 |
| 5,173,748 A * | 12/1992 | Bilhorn | ............ | G01J 3/2803 356/308 |
| 5,420,681 A * | 5/1995 | Woodruff | .............. | G01J 3/02 356/326 |
| 5,528,363 A * | 6/1996 | Fachinger | ............ | G01J 3/2803 356/326 |
| 5,550,375 A * | 8/1996 | Peters | ............... | G01J 3/02 250/343 |
| 5,559,597 A * | 9/1996 | Battey | ............... | G01J 3/02 356/328 |
| 5,623,473 A * | 4/1997 | Ichihara | ............ | B23K 26/04 359/566 |
| 5,657,121 A * | 8/1997 | Nishina | ............ | G01J 3/18 356/327 |
| 5,717,487 A * | 2/1998 | Davies | ............... | G01J 3/02 356/328 |
| 5,812,262 A * | 9/1998 | Ridyard | .............. | G01J 1/429 250/372 |
| 5,815,278 A * | 9/1998 | Johnston | ............ | G01N 21/553 356/445 |
| 5,825,484 A * | 10/1998 | Iwasaki | .............. | G01J 3/2803 356/300 |
| 5,880,834 A * | 3/1999 | Chrisp | .............. | G01J 3/02 356/305 |
| 6,057,925 A * | 5/2000 | Anthon | .............. | G01J 3/02 356/419 |
| 6,081,331 A * | 6/2000 | Teichmann | ............ | G01J 3/02 356/328 |
| 6,100,974 A * | 8/2000 | Reininger | .............. | G01J 3/02 356/300 |
| 6,151,112 A * | 11/2000 | Atkinson | .............. | G01J 3/2803 356/328 |
| 6,303,934 B1 * | 10/2001 | Daly | .............. | G01J 3/02 250/339.02 |
| 6,587,198 B2 * | 7/2003 | Olshausen | ............ | G01J 3/02 356/328 |
| 6,657,723 B2 * | 12/2003 | Cohen | ............... | G02B 6/12007 356/328 |
| 6,661,513 B1 * | 12/2003 | Granger | .............. | G01J 3/12 356/326 |
| 6,744,505 B1 * | 6/2004 | Wang | .............. | G01J 3/02 356/326 |
| 6,813,018 B2 * | 11/2004 | Richman | .............. | G01J 3/02 356/305 |
| 6,862,092 B1 * | 3/2005 | Ibsen | .............. | G01J 3/00 356/328 |
| 6,886,953 B2 * | 5/2005 | Cook | .............. | G01J 3/02 359/858 |
| 6,917,425 B2 * | 7/2005 | Caruso | .............. | G01J 3/02 356/326 |
| 6,977,727 B2 * | 12/2005 | Lerner | .............. | G01J 3/02 356/328 |
| 6,980,295 B2 * | 12/2005 | Lerner | .............. | G01J 3/18 250/339.07 |
| 6,985,226 B2 * | 1/2006 | Lerner | .............. | G01J 3/02 356/328 |
| 7,034,935 B1 * | 4/2006 | Kruzelecky | ............... | G01J 3/02 250/339.02 |
| 7,041,979 B2 * | 5/2006 | Chrisp | ............... | G01J 3/02 250/339.07 |
| 7,075,082 B2 * | 7/2006 | Tsao | ............... | G01J 3/02 250/339.07 |
| 7,081,955 B2 * | 7/2006 | Teichmann | ........... | G01J 3/0256 356/328 |
| 7,148,488 B2 * | 12/2006 | Horton | ................... | G01N 21/33 250/372 |
| 7,161,673 B2 * | 1/2007 | Da Silva | ............... | G01J 3/02 356/328 |
| 7,170,600 B2 * | 1/2007 | Nishii | ............... | G01J 3/18 356/328 |
| 7,180,590 B2 * | 2/2007 | Bastue | ............... | G01J 3/02 356/326 |
| 7,233,394 B2 * | 6/2007 | Odhner | ............... | G01J 3/02 356/308 |
| 7,236,243 B2 * | 6/2007 | Beecroft | ............... | G01J 3/02 356/328 |
| 7,239,386 B2 * | 7/2007 | Chrisp | .............. | G01J 3/18 356/328 |
| 7,330,258 B2 * | 2/2008 | Warren | .............. | G01J 3/02 356/328 |
| 7,345,760 B2 * | 3/2008 | Deck | .............. | G01J 3/02 356/305 |
| 7,382,498 B1 * | 6/2008 | Cook | .............. | G01J 3/02 356/326 |
| 7,483,127 B1 * | 1/2009 | Li | .............. | G01J 3/02 356/237.1 |
| 7,808,635 B2 * | 10/2010 | Chrisp | .............. | G01J 3/02 356/326 |
| 7,812,949 B2 * | 10/2010 | Delmas | .............. | G01J 3/02 356/326 |
| 7,817,274 B2 * | 10/2010 | Zhang | .............. | G01J 3/02 356/328 |
| 8,040,507 B2 * | 10/2011 | Shibayama | ........... | G01J 3/0291 356/328 |
| 8,174,695 B2 * | 5/2012 | Choi | .............. | G01J 3/02 356/328 |
| 8,345,226 B2 * | 1/2013 | Zhang | .............. | G01J 3/02 356/39 |
| 8,390,806 B1 * | 3/2013 | Subramanian | ........ | G01J 3/0259 356/328 |
| 8,861,060 B2 * | 10/2014 | Puegner | .............. | G01J 3/0202 359/197.1 |
| 9,435,689 B2 * | 9/2016 | Comstock, II | ........ | G01J 3/2823 |
| 9,488,577 B2 | 11/2016 | Andre et al. | | |
| 9,625,317 B2 * | 4/2017 | Correns | .............. | G01J 3/18 |
| 10,084,239 B2 * | 9/2018 | Shaver | .............. | H01Q 19/104 |
| 10,444,069 B2 * | 10/2019 | Rolland | .............. | G01J 3/18 |
| 10,444,145 B2 * | 10/2019 | Maschhoff | ............ | G01J 3/2823 |
| 10,520,361 B2 * | 12/2019 | Knobbe | .............. | G01J 3/18 |
| 2006/0038997 A1 * | 2/2006 | Julian | .............. | G01J 3/02 356/328 |

(56) References Cited

U.S. PATENT DOCUMENTS

| | | | | |
|---|---|---|---|---|
| 2006/0082772 A1* | 4/2006 | Kehoe | G01J 3/02 | 356/328 |
| 2007/0030483 A1* | 2/2007 | Everett | G01J 3/02 | 356/328 |
| 2007/0152154 A1* | 7/2007 | DeCamp | G01J 3/2803 | 250/339.07 |
| 2007/0171415 A1* | 7/2007 | Chrisp | G01J 3/02 | 356/328 |
| 2007/0194239 A1* | 8/2007 | McAllister | G01J 3/02 | 250/339.07 |
| 2007/0211250 A1* | 9/2007 | Teichmann | G01J 3/02 | 356/328 |
| 2007/0252989 A1* | 11/2007 | Comstock | G01J 3/02 | 356/328 |
| 2007/0262405 A1* | 11/2007 | Furuyama | B82Y 20/00 | 257/432 |
| 2008/0013086 A1* | 1/2008 | Deck | G01J 3/02 | 356/328 |
| 2009/0262346 A1* | 10/2009 | Egloff | G01J 3/02 | 356/326 |
| 2010/0039643 A1* | 2/2010 | Park | G01J 3/02 | 356/328 |
| 2010/0227200 A1* | 9/2010 | Miyata | H01J 37/153 | 428/800 |
| 2012/0236382 A1* | 9/2012 | Puegner | G01J 3/0202 | 359/209.1 |
| 2013/0271759 A1* | 10/2013 | Fattal | G01J 3/0208 | 356/301 |
| 2014/0055845 A1* | 2/2014 | Jain | H01S 5/005 | 359/344 |
| 2015/0022811 A1* | 1/2015 | Cornell | G02B 17/0636 | 356/326 |
| 2015/0116721 A1* | 4/2015 | Kats | G01J 3/26 | 356/454 |
| 2015/0241277 A1* | 8/2015 | Correns | G01J 3/18 | 356/305 |
| 2015/0288129 A1* | 10/2015 | Jain | H01S 3/094084 | 372/6 |
| 2016/0099701 A1* | 4/2016 | Rinaldi | G01J 5/20 | 422/90 |
| 2016/0126381 A1* | 5/2016 | Wang | H01L 31/035227 | 257/429 |
| 2016/0158886 A1* | 6/2016 | Kumar | B23K 26/06 | 219/121.61 |
| 2016/0178983 A1* | 6/2016 | Alloatti | G02F 1/0305 | 385/122 |
| 2016/0356649 A1* | 12/2016 | Yokino | G01J 3/0291 | |
| 2017/0003169 A1* | 1/2017 | Shaltout | G01J 3/447 | |
| 2017/0030773 A1* | 2/2017 | Han | G01J 3/0208 | |
| 2017/0082263 A1* | 3/2017 | Byrnes | F21V 5/045 | |
| 2017/0176689 A1* | 6/2017 | Popp | G02B 1/002 | |
| 2017/0194522 A1* | 7/2017 | Wang | H01L 27/1443 | |
| 2017/0201658 A1* | 7/2017 | Rosenblatt | G02B 1/007 | |
| 2017/0322457 A1* | 11/2017 | Chanda | B82Y 20/00 | |
| 2017/0346257 A1* | 11/2017 | Garnache-Creuillot | H01S 5/14 | |
| 2017/0370773 A1* | 12/2017 | Kim | G01J 3/12 | |
| 2018/0045953 A1* | 2/2018 | Fan | G02B 27/0012 | |
| 2018/0059440 A1* | 3/2018 | Yu | G02F 1/0018 | |
| 2018/0156949 A1* | 6/2018 | Tsai | G02B 5/008 | |
| 2018/0172517 A1* | 6/2018 | Grueger | G01J 3/18 | |
| 2018/0178571 A1* | 6/2018 | Zhu | G02B 5/008 | |
| 2018/0202918 A1* | 7/2018 | Tanaka | G01N 21/01 | |
| 2018/0231702 A1* | 8/2018 | Lin | G02B 5/1871 | |
| 2018/0240653 A1* | 8/2018 | Akselrod | B29D 11/00326 | |
| 2018/0246262 A1* | 8/2018 | Zhan | G02B 5/1871 | |
| 2018/0252857 A1* | 9/2018 | Glik | G02B 6/0016 | |
| 2018/0274750 A1* | 9/2018 | Byrnes | F21V 5/045 | |

* cited by examiner

Fig. 5

SYSTEM FOR ANALYZING ELECTROMAGNETIC RADIATION, AND DEVICE FOR PRODUCING SAME

CROSS-REFERENCE TO RELATED APPLICATION

This application claims priority from German Patent Application No. DE 10 2016 225 344.1, which was filed on Dec. 16, 2016, and is incorporated herein in its entirety by reference.

Embodiments of the present invention relate to a polychromator and the manufacturing method thereof. Advantageous embodiments relate to a system for analyzing electromagnetic radiation and to devices for producing same.

BACKGROUND OF THE INVENTION

Specific substance properties, e.g., the carbon dioxide concentration of respiratory air, the humidity of wood or paper, or the composition of plastics may often be analyzed by means of comparatively simple optical methods, e.g., with the aid a polychromator. In a large amount of application cases, comparatively simple information may be used for controlling an operating sequence or a process. Controlling drying of raw paper or determining the colorific value of wood, or wood pellets, are based on determining humidity. Just like determining the content of carbon dioxide in air, spectral-analytic system may provide accurate measurement values in said application cases merely by evaluating only two spectral bands—a measurement band and a reference band.

What is typical for said applications and many other examples of applications is the critical cost situation regarding the system. Low-cost systems make a decisive contribution to keeping manufacturing costs low. What is relevant is the respective total cost of ownership (TCO), which includes service and operating costs. Often, there are solutions which are technically feasible but involve too much expenditure in the long term. For example, commercially available near-infrared spectrometers are problematic because of their high investment costs; other approaches based, e.g., on optical filters or LED light sources are often limited in terms of reliability or long-term stability.

What is desirable is a system approach which is characterized by a small amount of expenditure in terms of manufacturing and operation and performs simple spectral-analytical measurement with reliability and long-term stability. The selection of the spectral bands considered should be easily adaptable within the context of the manufacturing process, the level of variability should be as large as possible, and the overall solution should be small, robust and low-cost.

Conventional technology discloses numerous methods of detecting chemical composition. Problems provided in a gaseous, liquid or dissolved form may be analyzed by means of chromatographic methods. Measurement is generally destructive.

Radiographic methods, e.g., X-ray florescence analyses (XRF) or atomic absorption spectrometry (AAS) involve a large amount of expenditure and represent potential health hazards.

Optical spectroscopy is a widely employed method both for utilization in laboratories and for performing field measurements. Complex spectral-analytical measurement tasks are typically performed by using spectrometers. Said spectrometers are available in manifold variants and for various spectral ranges. However, specifically within the range of near-infrared and infrared wavelengths, which range is important for analyzing organic compounds and water, spectrometers are expensive and often too sensitive for being used in the field and in production. Miniaturized variants of spectrometers, which are mainly based on designs having fixed gratings and detector lines, may reduce said disadvantage but are still too expensive for many applications.

System approaches based on interferometers, so called Fabry-Perot filters, are often critical with regard to vibrations occurring during use. Other approaches using spectral filters exhibit disadvantages regarding reliability and long-term stability. This also applies to approaches wherein light of different wavelengths is generated, for example, by selected LEDs.

Conventional technology also describes so-called polychromators which, similar to spectrometers, split up incident light into its spectral constituents but then will detect said incident light only at selected points of the spectrum in that a single detector is positioned at the appropriate location behind a suitably configured gap for aperture limitation. Such systems have so far been used mainly in the field of very high resolutions with very large designs. Miniaturization has been limited due to the adjustment expenditure which has so far been involved in order to achieve the desired level of precision.

SUMMARY

According to an embodiment, a polychromator may have: a substrate; and a functional element having an optical spectral decomposition action and being configured to spectrally decompose electromagnetic radiation originating from an entry opening, a spectrally decomposed spectrum being obtained, and to direct the spectrally decomposed spectrum onto a spatial area of the substrate, wherein the substrate includes at least two transparent zones at different positions within the spatial area, so that two different spectral components of the spectrum are detectable at the two transparent zones.

According to another embodiment, a method of producing a polychromator including a substrate and a functional element having an optical spectral decomposition action configured to spectrally decompose electromagnetic radiation originating from an entry opening, a spectrally decomposed spectrum being obtained, and to direct the spectrally decomposed spectrum onto a spatial area of the substrate, may have the steps of: forming the substrate such that at least two transparent zones are configured at different positions, two different spectral components of the spectrum being detectable at the two transparent zones.

Embodiments of the present invention provide a polychromator comprising a substrate and a functional element having an optical spectral decomposition action, e.g., a grating or a prism. The functional element having an optical spectral decomposition action is configured to spectrally decompose electromagnetic radiation originating from an entry opening, e.g. light which originates from a suitable radiation source and is reflected by a sample, so that a spectrally decomposed spectrum being obtained, and to direct the spectrally decomposed spectrum onto a spatial area of the substrate. The substrate comprises at least two transparent zones at different positions within the spatial area, so that two different spectral components of the spectrum are detectable at the two transparent zones, e.g. (aperture) diaphragms. The two transparent zones may have two detectors associated therewith for this purpose. By means of this embodiment, evaluation of a spectrum with a small number of spectral bands is possible; low-cost manufacturing may be achieved by using a substrate which has the transparent zones (gaps or pinholes) introduced therein, e.g., by means of lithography. This production process is not only low-cost, but also very reliable and highly precise so as to produce the exact positions for the desired spectral bands.

Embodiments of the present invention are based on the finding that by using a substrate, advantageously a one-part substrate such as a semiconductor substrate, for example, which is workable by means of semiconductor production technologies, highly accurate distances between two transparent zones (opening, gap), in particular two aperture openings, may be set. When using said substrate, which has been manufactured in this manner, in combination with a functional element having an optical spectral decomposition action, such as a periodic element, for example, an apparatus, or a polychromator, may thus be adjusted to exactly two characteristic spectral components, so that an apparatus for evaluating a spectrum having two or more spectral bands will be obtained by means of low-cost but nevertheless highly precise and, consequently, also highly accurate means. Depending on the distance selected, a modified apparatus may thus be provided for examining a modified spectrum and/or for optimizing the apparatus in terms of other spectral components to be evaluated.

As was already indicated, the at least two different positions each have a wavelength associated with them; in accordance with further embodiments, the distance is selected at least such that it corresponds to at least a spectral wavelength distance.

In accordance with further embodiments, rather than the two transparent zones, respectively, it is also possible to provide three transparent zones in combination with three detectors, or even more transparent zones in combination with more detectors, so that even a spectrum having more than two spectral bands is easily detectable.

In accordance with further embodiments, a radiation source having an optional beam former such as a diaphragm, a microlens, or other aperture openings, for example, may be provided at the entry opening. Also in accordance with a further embodiment, it is advantageous here that the beam former, or the diaphragm, be arranged within the one substrate. So as to then emit the light beam out of the plane, so that said light beam will be found again in an unfolded form within the same plane, said unfolding will occur with the aid of the spectrally acting functional element, e.g., in reflection. For the embodiment which is introduced here and has the one substrate which also has the transparent zone provided therein, further reflection means (further optical functional elements) will then be provided which reflect the beam (electromagnetic radiation), e.g., prior to or following the unfolding. In accordance with an advantageous variant, the functional elements having a spectrally decomposing action are configured as reflective gratings; the electromagnetic radiation will then be reflected prior to and following the unfolding, so that the electromagnetic radiation may be directed back to the one substrate.

In accordance with a further embodiment, provision may also be made for so-called "duplicating means", e.g., for utilization of a perpendicularly illuminated grating, and diffraction of light in opposite directions in accordance with positive and negative diffraction orders in accordance with the grating equation, so that the one beam is unfolded onto two spatial areas, namely to a first spatial area and a further spatial area. Both in the first and in the further spatial area, the substrate comprises one or more transparent zones, so that in the event that specific spectral components are associated with the respective positions, additional spectral components for additional spectral lines may thus be examined. This is advantageous in particular when the spectral lines to be examined are very close together, so that it would typically be no longer possible, with a compact apparatus, to resolve the individual spectral lines. This is why in accordance with advantageous embodiments, the transparent zone has such a position within the further area that the spectral component to be detected lies between the two spectral components (which belong to the at least two transparent zones within the first area). In accordance with an advantageous variant, the apparatus includes only a substrate wherein the transparent zones are provided for the first area and the further area. Advantageously, a diaphragm may also be provided between the two areas, through which diaphragm the radiation source emits the electromagnetic radiation. In this embodiment, mirrors are employed.

In accordance with a further advantageous embodiment, the one substrate also includes the functional means which cause splitting of the spectrum. In this manner, it can be ensured that any mutual positioning may be accurately produced by means of highly standardized semiconductor production methods.

A further embodiment relates to a method of manufacturing the above-explained polychromator. In particular, the method includes the step of forming the substrate, so that at least two transparent zones are configured, and arranging the substrate within the spatial area, so that the at least two transparent zones are arranged at different positions along the spatial area. In accordance with an optional variant, the step of forming may be supported by lithography steps or at least one lithography step or the step of laser cutting or etching. In accordance with one embodiment, the method also includes the step of dicing the substrate as a multitude of contiguous substrates (wafer).

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be explained below by means of the accompanying drawings, it shall be noted that elements and structures which have identical actions are provided with identical reference numerals.

FIG. 1 shows a polychromator 10 comprising, e.g., a housing. The housing has an optional radiation source 12, a functional element having an optical spectral decomposition action 14, e.g., a grating, as well as a substrate 16 comprising two detectors 18 and 18b provided therein. The functional blocks are mutually oriented such that electromagnetic radiation 13 emitted by the radiation source 12 arrives, via the functional element having an optical spectral decomposition action 14, at the substrate 16 and then at the detectors 18a and 18b. In this embodiment, all of the four elements mentioned are arranged in series, which means that operation here is effected without any reflection but only with transmission.

Figure 1A:
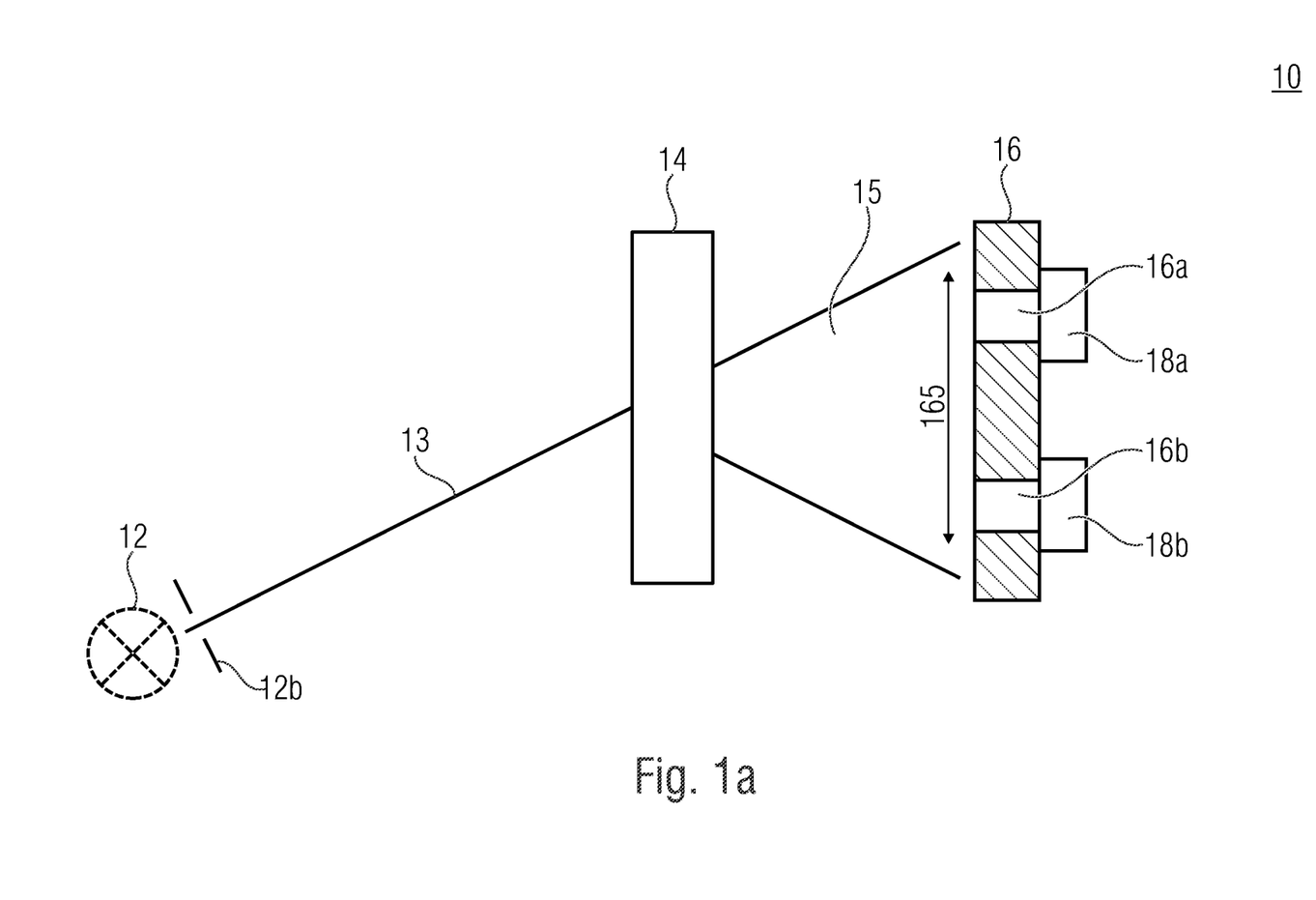
FIG. 1a shows a schematic block diagram of a polychromator in accordance with an elementary embodiment.

The optional radiation source 12, which is arranged in front of an entry opening 12b for the beam 13 (electromagnetic radiation), may be a light source, for example, which illuminates a sample or a gas column whose back-scattered and or transmitted light enters the polychromator. Alternatively, only one entry opening may be provided via which electromagnetic radiation, or the light of any origin, enters the polychromator 10. An entry opening is understood to mean not only a "mechanical" opening, but also an optical opening, e.g., chromium-on-glass substrate having a patterned gap, i.e., generally a transparent zone. A transparent zone 12b and 16a/16b, respectively, is an area whose light/radiation transmission is higher than that of the surroundings. Light includes a broad spectral range, e.g., from 780 nm to 6000 nm.

Within element 14, the beam 13 is spectrally split up by a suitable means, e.g., a grating or a prism. As a result of the splitting, the unfolded spectrum enters an image plane and/or an area of the substrate 16 at different spatial angles. In other words, this means that the different spectral components are imaged onto the substrate 16 at different spatial angles. A functional element having an optical spectral decomposition action 14 is understood to mean an element configured to image/deflect a frequency range, e.g., a visible range and/or an infrared spectral range and/or an ultraviolet spectral range, in different directions in a frequency-selective manner.

This (first) area of the substrate 16, e.g., made of silicon or any other semiconductor material with or without lateral structures (BSOI wafer), is provided with reference numeral 16s and represents the distribution of the intensity of all functions of the wavelength. Selecting the target area is possible in each case by specifying spatial coordinates which correlate with the minimum and maximum wavelengths, respectively, of a spectral band which are to be considered. The substrate 16 includes several different bands, such as the two bands associated with the diaphragms 16a and 16b. Depending on the spatial arrangement of said transparent zones, or diaphragms, 16a and 16b, different spectral bands and/or spectral components/spectral lines may be examined. The dimensions (diameters and widths) of the diaphragms 16a and 16b may vary, so that it will not be mandatory for said diaphragms to have identical dimensions. What is important in terms of positioning of the diaphragms 16a and 16b is that they are arranged precisely for the specified spectral bands and/or spectral (atomic or molecular) transitions.

This substrate 16 is manufactured, for example, by using processes of semiconductor production or production methods generally used in microsystems technology, including, e.g., lithography steps. Such production technologies ensure precise positioning of the at least two gaps 16a and 16b (aperture diaphragms). By means of such production methods, the extreme requirements in terms of precision that are placed upon the locations and widths of the gaps 16a and 16b can be met, said technology also entailing the miniaturization system approach for achieving very small sizes, or very compact designs. It is difficult or not all possible to implement such a system in a profitable manner by using the usual means of precision engineering.

Optional detectors 18a and 18b are arranged behind the gaps 16a and 16b, i.e., are associated with them, so that they may detect the unfolded electromagnetic radiation 15 entering through the transparent zones 16a and 16b. The detectors may be identical or different, for example, and may be configured to detect the radiation at least in the area associated with the positions of the transparent zones 16a and 16b.

In accordance with further embodiments, it shall be noted that the positional deviation of the gaps 16a and 16b is clearly smaller than the dimensions of the gaps, i.e., their widths per se. Alternatively, it would also be possible to specify the resulting inaccuracy in terms of width and/or position in relation to the wavelength of the spectral bands to be analyzed.

A further embodiment relates to a manufacturing method, in particular for manufacturing the substrate. As was already indicated above, said substrate is produced by means of production methods used in microsystems technology such as lithography or laser cutting, for example. In semiconductor production technology, further methods are known by means of which suitable substrates may be re-shaped in a structured manner by means of chemical etching from the front and/or rear sides. Stand-alone structures, diffraction gratings and gaps have been successfully produced by deep etching of silicon substrates (wafers). On the basis of their devices, spectroscopic instruments, i.e., so-called "scanning grating spectrometers", have been successfully implemented (cf. Tino Pugner, Jens Knobbe, Heinrich Gruger, "Near-Infrared Spectrometer for Mobile Phone Applications"; Applied Spectroscopy 2016, vol. 70(5) 734-745). A next step comprises appropriately positioning the substrate 16 within the apparatus 10, e.g., opposite the functional element 14, so that the positions of the transparent zones 16a and 16b coincide with the spectral band desired accordingly.

It shall also be noted at this point that the method may include additional steps such as dicing the substrates, which have been processed in this manner, from a multitude of contiguous substrates (within a wafer). With regard to FIGS. 1b to 1d, a possible embodiment of the substrate 16 will be explained below.

Figure 1B:
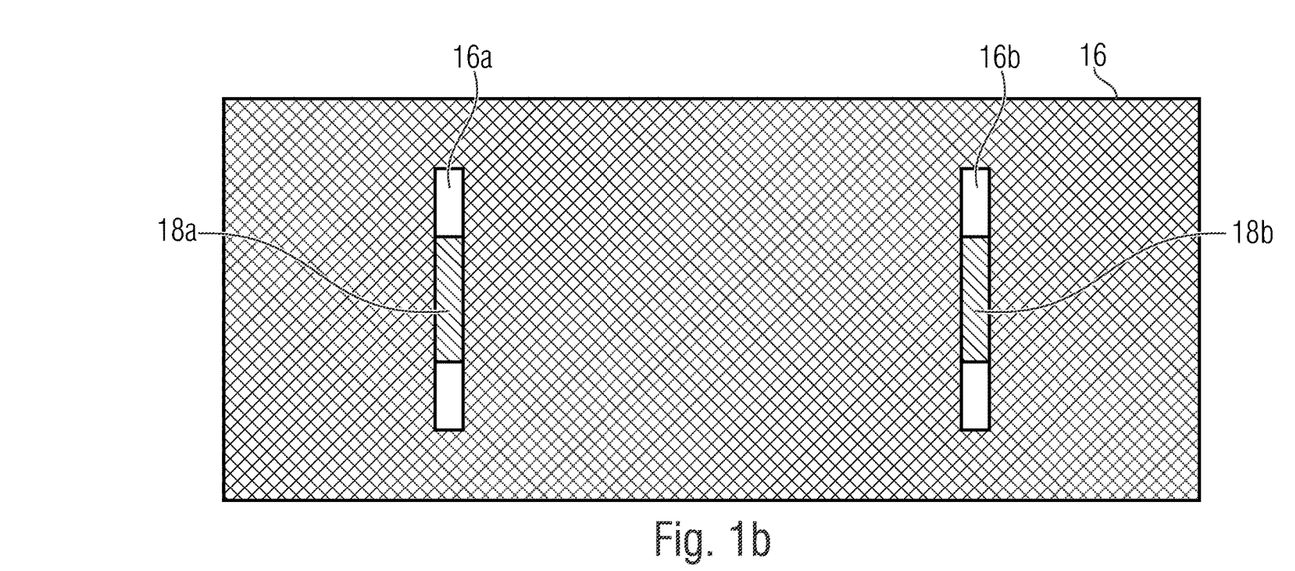
FIGS. 1b, 1c show schematic block diagrams of the substrate comprising the two transparent zones in a top view and a sectional view, respectively.
Figure 1C:
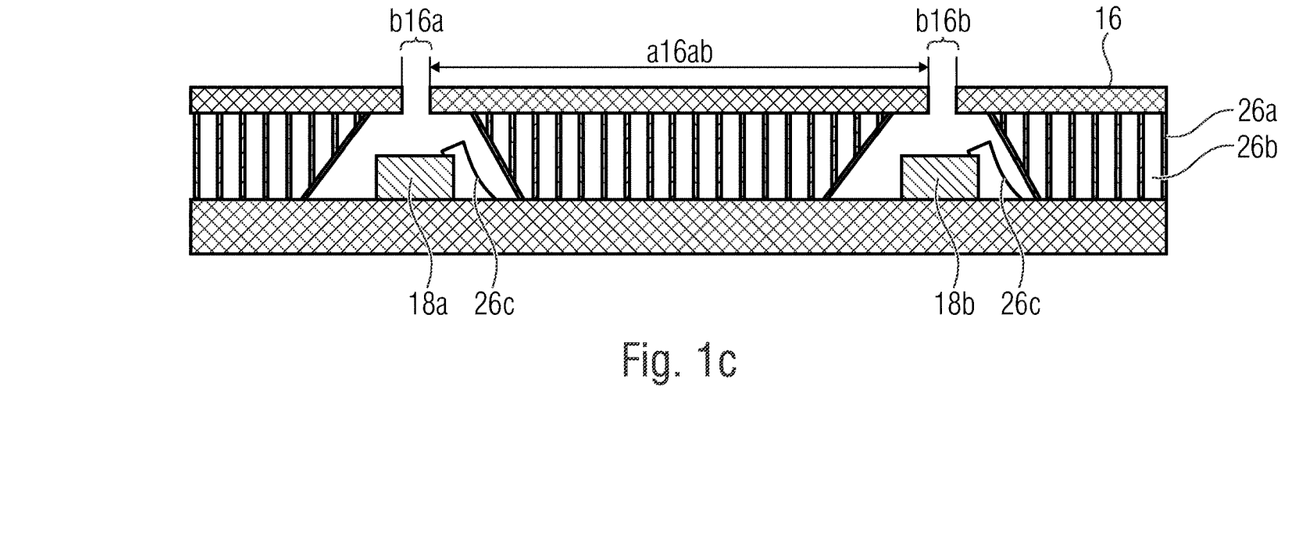
Figure 1D:
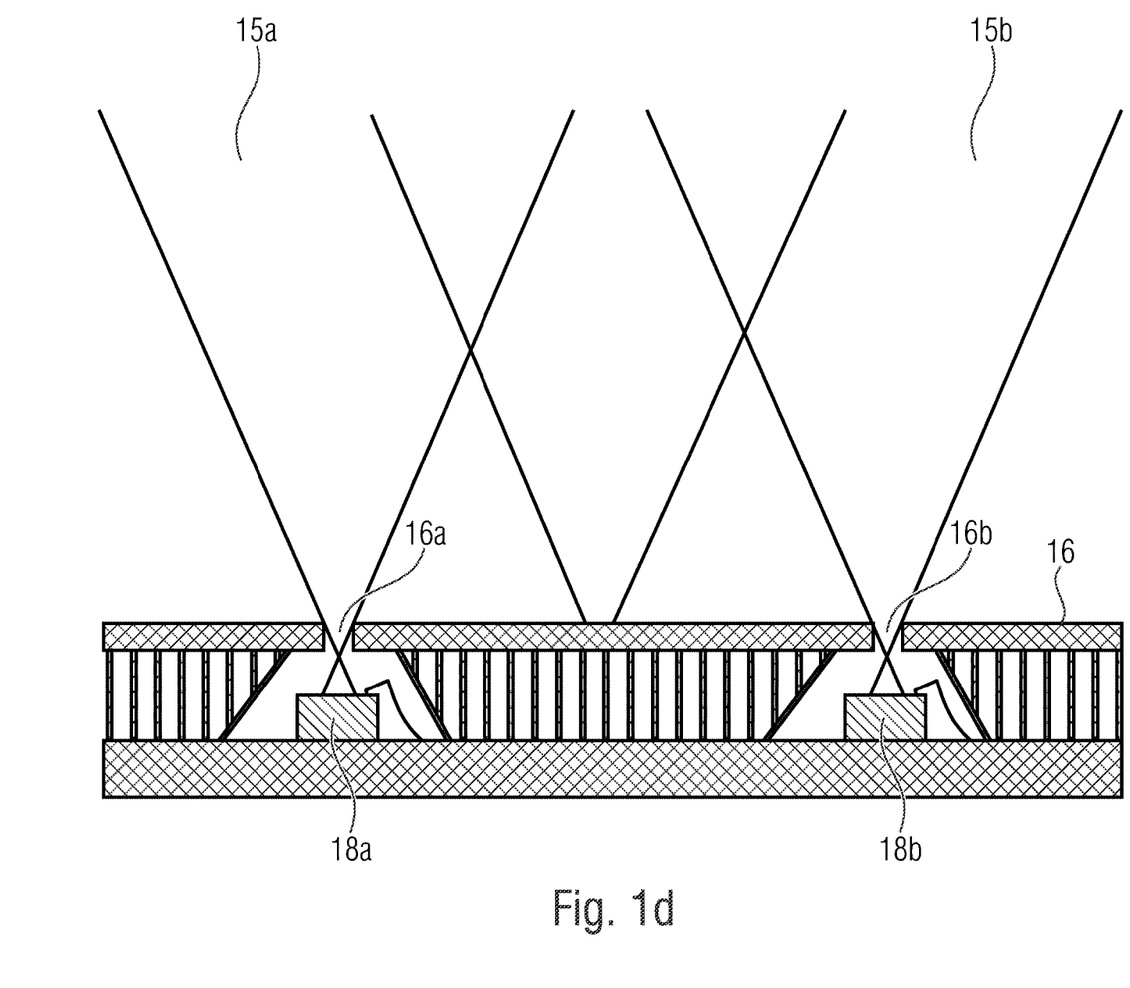
FIG. 1d shows a schematic representation of the substrate comprising the two transparent zones, which substrate has an unfolded beam projected onto it.

FIG. 1b shows a top view of the substrate 16 comprising the two gaps 16a and 16b, which are arranged in a manner transverse to the longitudinal extension and which may have a length/width ratio of 5:1 or 3:1. As is shown, in particular, in FIG. 1c, the gaps 16a and 16b are arranged at a distance a16ab, which may vary as a function of the spectral bands to be detected and ranges from 10 μm to 10 mm. Depending on the configuration of the system, said geometric distance corresponds to a spectral distance ranging from 1 nm to 10000 nm. The width per gap 16a and 16b may correspond, e.g., to a spectral bandwidth of from +/−30 nm to +/−50 nm.

The gaps 16a and 16b have the detectors 18a and 18b associated with them, which, as may be seen, in particular, in FIG. 1b, need not necessarily extend across the entire length of the gaps 16a and 16b. As is shown, in particular, in FIG. 1c, the detectors 18a and 18b located behind the gaps 16a and 16b may be electrically connected to a conductor pattern located on the substrate 18 by means of a bonding wire 26. The detectors 18a and 18b are either bonded onto the substrate 26b or fastened there in any other manner. At any rate, the arrangement is selected such that the unfolded light beam, which is depicted by means of the two spectral components 15a and 15b in FIG. 1d, will impinge upon the detectors 18a and 18b once it has passed the transparent zones 16a and 16b.

With reference to FIGS. 2a to 2d, three different embodiments will be explained below which relate to arranging the light source, the substrate including the detectors, and the grating as a functional element having a spectrally decomposing action.

Figure 2A:
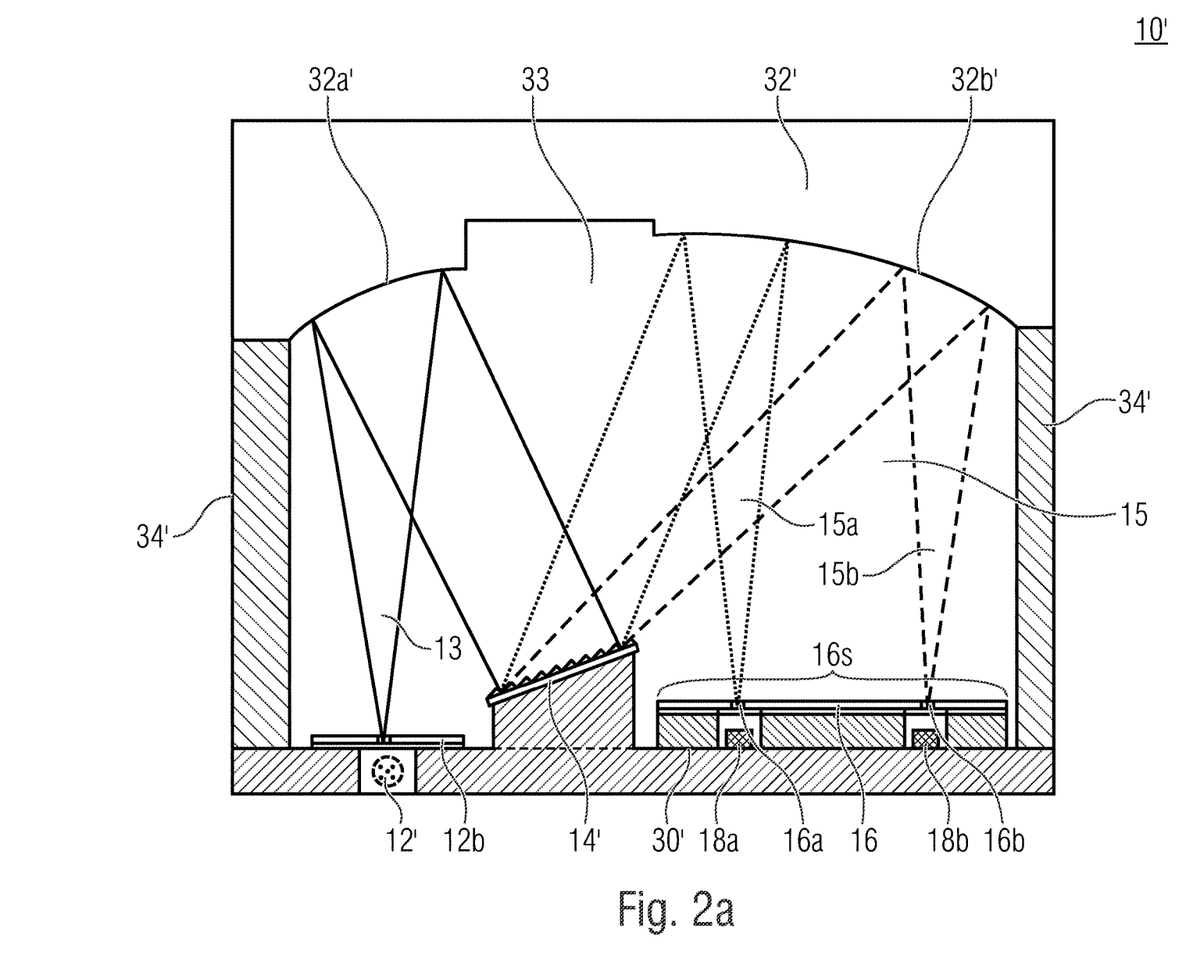
FIG. 2a shows a schematic representation of a polychromator in accordance with an extended embodiment.

FIG. 2a shows a polychromator 10' comprising a radiation source 12' provided with a diaphragm 12b, the substrate 16 having the detectors 18a and 18b arranged behind it, and a functional element having a spectrally decomposing action 14', which here is a reflective grating. All of said elements 12', 12b, 14', 16, 18a and 18b are arranged next to one another within, or on, a plane. Said plane is provided with the reference numeral 30'.

Reflection means (optical functional elements) 32' are provided opposite the plane 30' and/or the units 12', 12b, 14', and 16. Said reflection means 32' include, in this embodiment, two curved (parabolic) mirror surfaces 32a' and 32b', which are oriented such that the light beam 13 from the source 12' is reflected, via the grating 14', as a light beam 15 unfolded by the grating 14', onto the substrate 16 and/or into the spatial area 16s, where the transparent zones 16a and 16b are arranged. It shall be noted at this point that the depicted area 12s is "spatial" in a very strict sense only (in the area of a substrate thickness); however, the ratio between the thickness and the lateral dimensions in this case is very small, i.e. a surface. Imaging is useful only if it takes place within the range of an optical depth of focus. However, spectrally selective deflection of the radiation typically goes into different spatial areas (without necessarily being focused).

More specifically, the light beam 13 (cone) is reflected by the reflective face 32a', while the unfolded cone of light 15 is reflected by the face 32b, wherein focusing may occur. The cone of light 15 includes the spectrally unfolded light beams (spectral components) 15a and 15b, both of which are projected onto different positions of the substrate 16 in the area 16s in a frequency-selective manner. In addition to beam focusing, which is advantageous in the case of gratings, an advantage of the reflection means 32' is that all three of the radiation source 12' comprising the diaphragms 12b, the grating 14', and the substrate 16 are arranged on a plane 30, which significantly improves accurate positioning.

In accordance with embodiments, the reflective element 32' is kept at an appropriate distance by means side panels 34'. At the lateral position of the grating 14', the reflective element 32' has a recess, since no reflection occurs here.

Figure 2B:
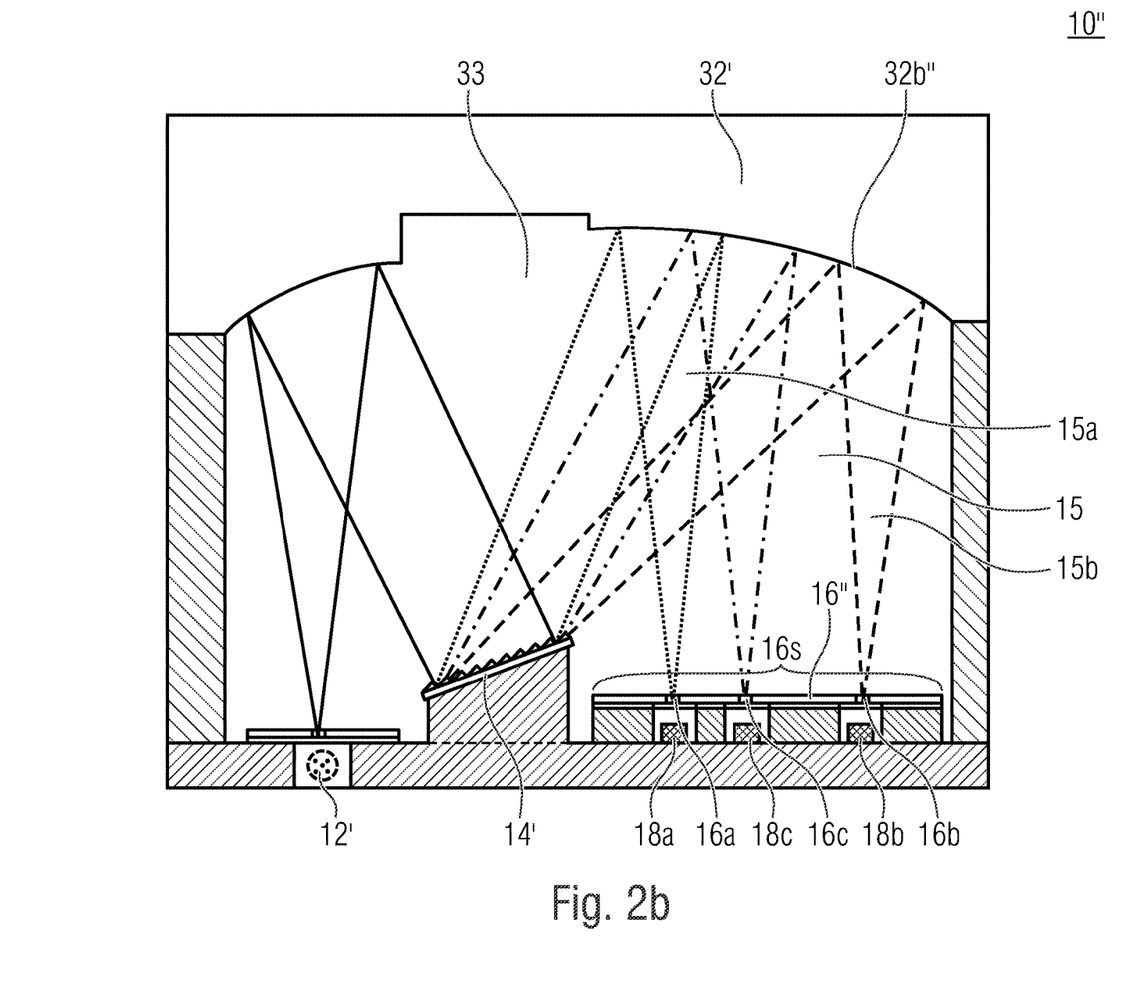
FIG. 2b shows a schematic representation of a polychromator in accordance with a modified extended embodiment.

FIG. 1b shows a further polychromator 10", which differs from the polychromator 10' in that the substrate 16" comprises, in the area 16s, three transparent zones 16a, 16b and 16c, which have three detectors 18a to 18c arranged behind them. As may be seen, it is not mandatory for the transparent zones 16a and 16b to be equally spaced apart from each other, so that it will be sufficient for said three transparent zones 16a to 16c to be arranged within the area 16s.

It shall be noted at this point that here, in the unfolded radiation spectrum 15, three spectral components which forward the split-up beam 13 to the detectors 18a to 18c are marked by reference numerals 15a to 15c. Further changes, e.g. on the reflection means 32' and/or the grating 14' or the radiation source 12' are not mandatory here.

Figure 2C:
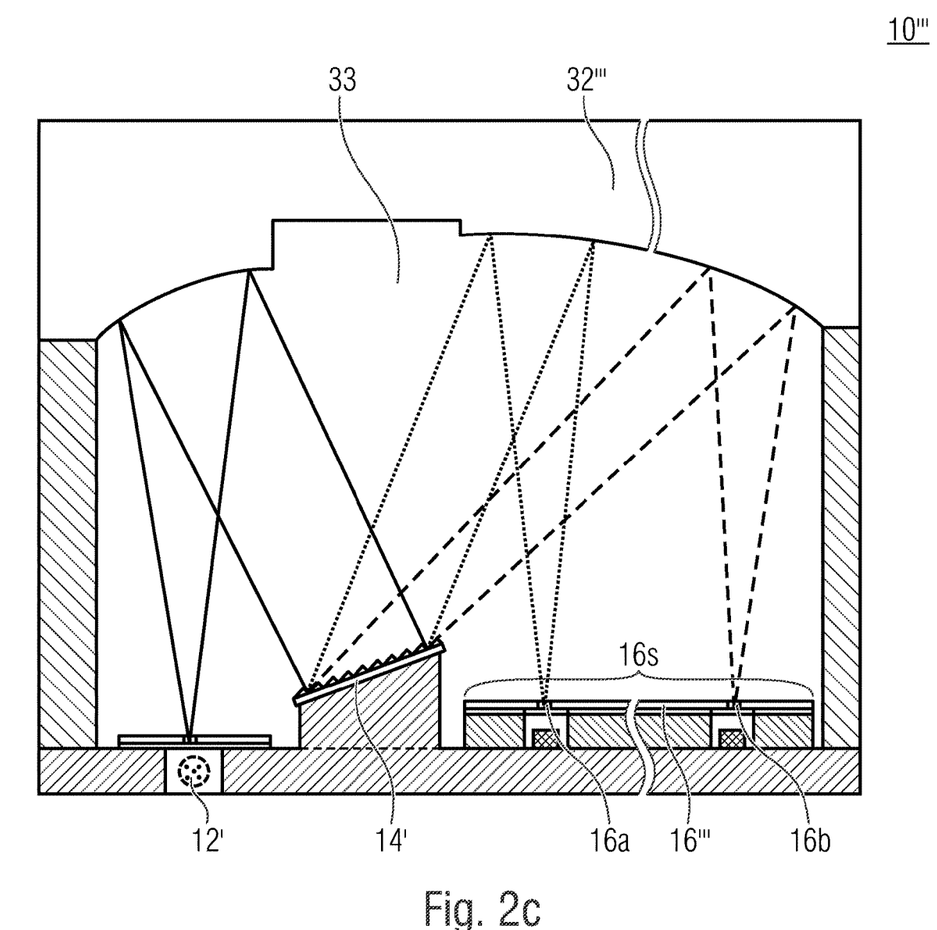
FIG. 2c shows a schematic representation of a polychromator in accordance with a further extended embodiment.

Based on the embodiment 10', FIG. 1c shows a further variant, namely the polychromator 10''', wherein the interruption in the substrate 16''' and/or the reflection means 32''', in particular in the area of the reflector 32b'', indicates that both the reflector 32b'' and the substrate 16''' may be extended further, so that, e.g., the transparent zones 16a and 16b are further spaced apart from each other so as to cover a broader wavelength range by means of the geometric area 16s''', and/or to provide a better resolution of the wavelength range.

Three specific applications of the polychromators explained above will be discussed below.

1. Gas analysis system (e.g. NDIR, non-dispersive infrared): concentration measurements, in particular those providing absolute values (% by volume), may be effected by means of absorption measurements along a gas column. For applications in gas analysis, a light path of a known length by means of which the specific absorption of a gas, e.g. $CO_2$, in air is detected is relevant.

In an arrangement in accordance with 10, 10', 10'', 10''', a gas column is illuminated with the light of a light source 12, 12' configured accordingly, e.g. a halogen lamp, and is analyzed by the polychromator. Due to the location of the grating 14, 14' and the positions, or widths, of the gaps 16a to 16c, the spectral bands are selected at 3910 nm and 4220 nm (each having a width of from +/−30 nm to +/−50 nm), and the intensity is detected and converted to an electric signal by an infrared detector, advantageously a pyroelectric element or a thermopile. The signals are detected by an electronic evaluation circuit and evaluated within data processing means. By means of the intensities detected, a quantitative statement may be made regarding the carbon dioxide content of the analyzed air. If applied in indoor air monitoring, this may be advantageously used for recommending performing ventilation or for controlling corresponding ventilation means.

2. Near-infrared measurement of water content: in the field of detecting the water content, or the degree of drying of wood, cardboard and paper, one typically uses spectral bands at three wavelengths, a reference band and a further band, which is correlated with hydrocarbons, being used in addition to a water band. Said bands may lie within the so-called near-infrared range from 780 nm to 2500 nm. Measurement is performed in reflection, the sample is illuminated by a suitable light source, and the back-scattered light is examined by the analysis system. By means of a system approach in accordance with 10 to 10''', the gaps are placed, within the device 16 to 16'''', such that they correspond to the spectral bands. Three photodiodes in InGaAs technology are used for detecting the level of intensity.

What is advantageous as compared to an alternative solution, which is disclosed in conventional technology and uses three infrared LEDs for spectrally varying illumination of the sample, is the possibility of being able to accurately take into account the spectral transitions in accordance with their very nature by means of the locations and widths of the gaps, and to not be dependent on the technologically predefined emission line widths of LEDs. In addition, the problem of spectral long-term drift of infrared LEDs is solved.

3. Near-infrared analysis of plastics: the absorption spectra of numerous commonly used plastics such as polyethylene (PE), polypropylene (PP), polystyrene (PS), polycarbonate (PC), polyethylene terephthalate (PET) and others differ specifically in the range of the C—C and the C—H bands between 1650 nm and 1780 nm. Identification of various plastics by means of a spectral analysis is possible on this basis. For example in the field of incoming goods inspection and of recycling, such analyses are very important. Appropriate system approaches have been provided, in a miniaturized design, for mobile use as portable devices (e.g. Phazir by Polychromix/Thermo Fischer), wherein the degree of miniaturization that has been reached and the system cost still have enormous potential for optimization. For this task, which is clearly more complex than the previous examples of application, evaluation of closely adjacent spectral lines may be advantageous. Due to the physical facts given in the implementation of the inventive approach, in particular the size of detectors and the consequent minimum distance of adjacent bands, it may be advantageous to use a specific implementation of the system which provides two separate spatial areas for placing exit gap devices and detectors, which placement may be addressed by using positive and negative first-order diffraction (which is possible only when using a grating as a diffractive element, and it is advantageous when the grating is symmetrical—e.g. an Si-etched V-stage grating).

Figure 5:
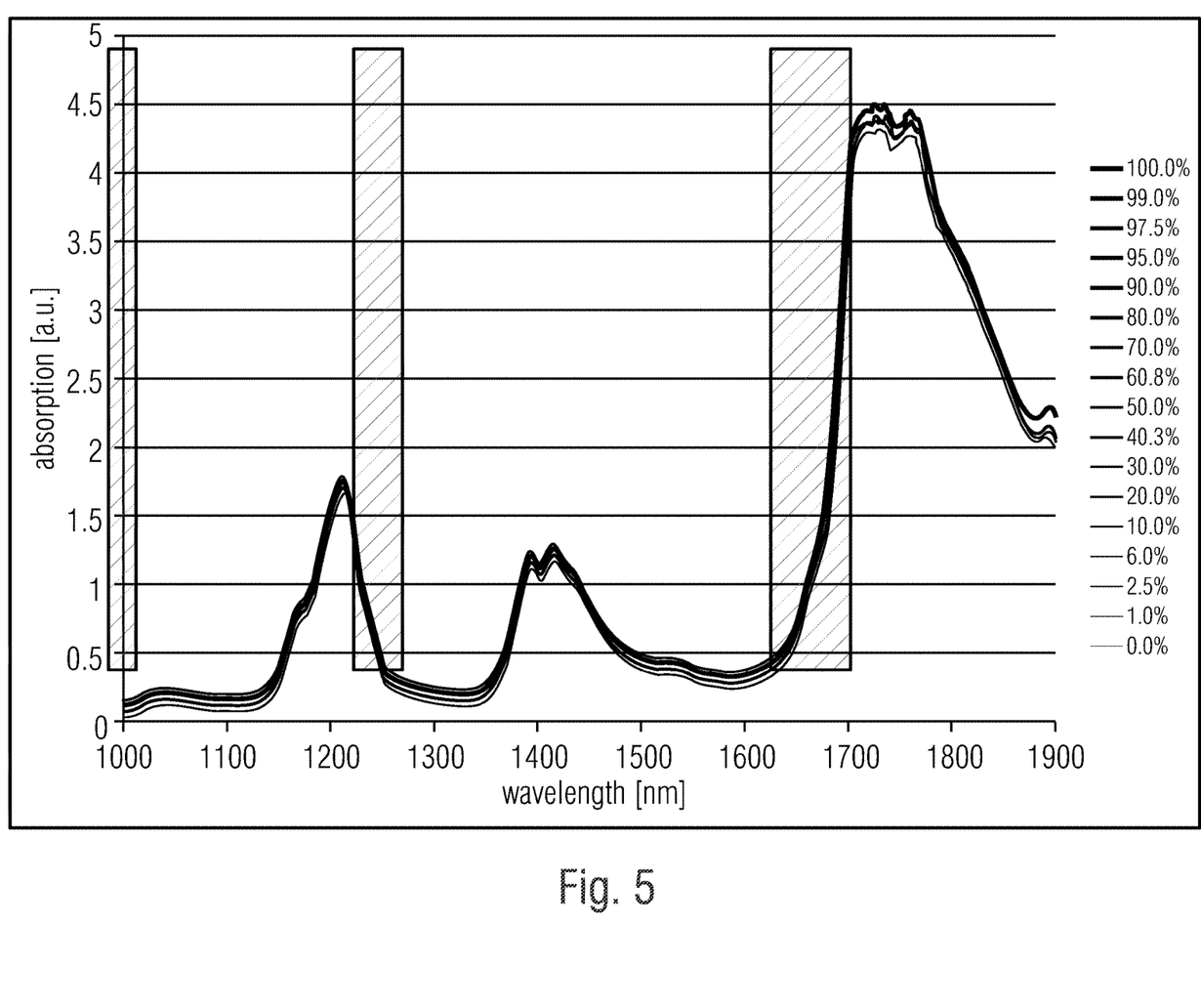
FIG. 5 shows a schematic diagram of an absorption rate plotted across the wavelength for illustrating spectroscopy while using few spectral bands.

The selection of the respective characteristic spectral ranges is illustrated by means of FIG. 5, for example. FIG. 5 shows three marked areas wherein the wavelengths are detected so as to perform a good analysis by means of the polychromator. In addition to the marked wavelengths, a plurality of graphs are also depicted which are associated with different absorption rates and consequently also result in different absorption rates.

Figure 3:
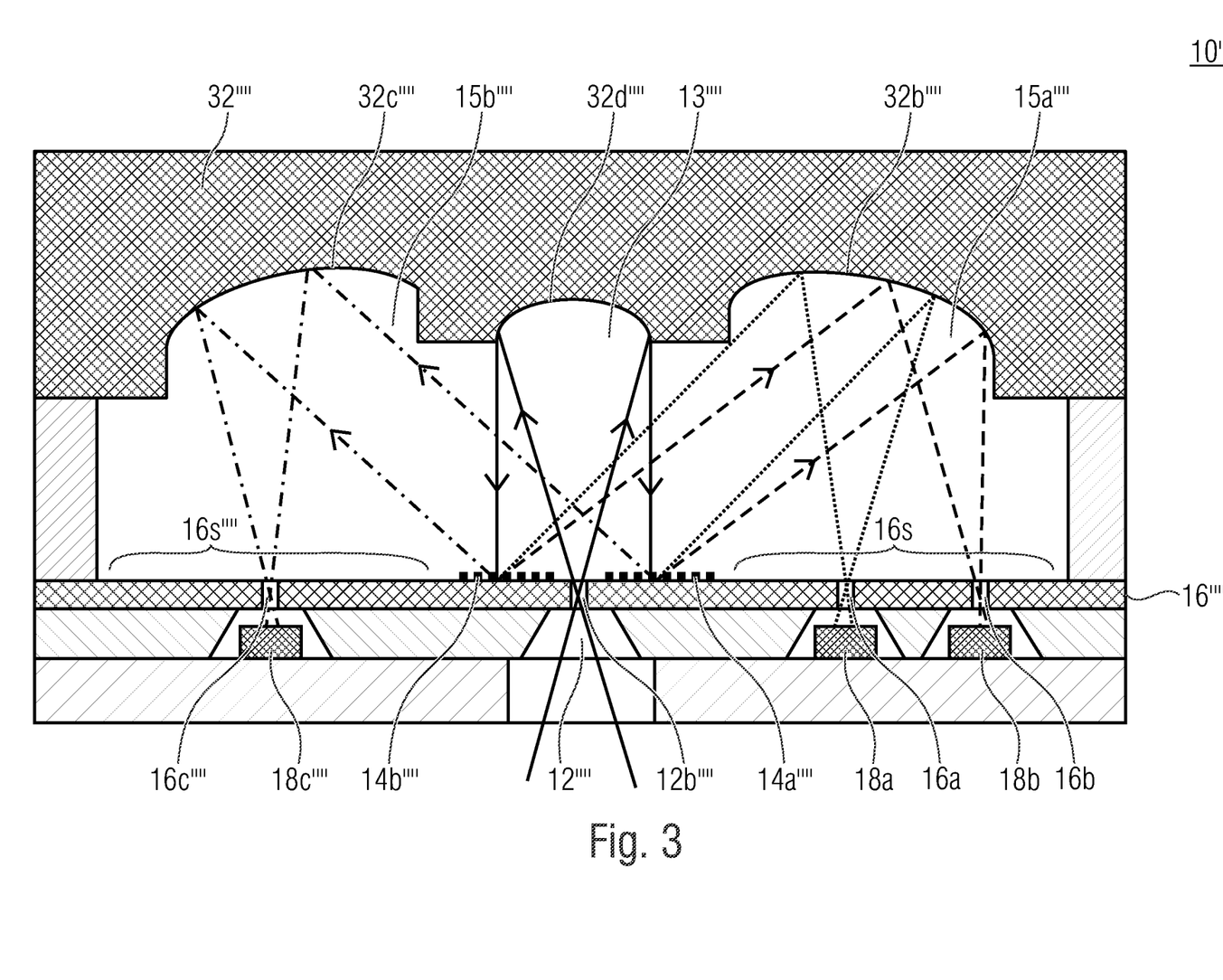
FIG. 3 shows a schematic representation of a polychromator comprising two projection areas in accordance with an embodiment.

FIG. 3 shows a further variant of a polychromator, namely polychromator 10"". With this polychromator 10"", two geographic examination areas 16s and 16s"" are provided on two sides, starting from the radiation source 12"". In this embodiment, however, a single functional element having a spectrally decomposing action 14a"" and 14b"" is arranged between the radiation source 12"" and the first or second area 16s and 16s"", respectively. The two functional elements/gratings 14a"" and 14b"" belong together in accordance with embodiments. The diaphragm 12b"" of the radiation source 12"" is arranged between said two grating parts 14a"" and 14b"". The beam 13"" is emitted by the diaphragm 12b"" toward the first reflection means 32a"" and is reflected, by means of the reflection means 32a"", to the two functional elements having a spectrally decomposing action 14a"" and 14b"". The latter are also designed to be reflective, so that the spectral component, which is now unfolded (cf. 15a"" and 15b""), is reflected by the elements 14a"" and 14b"" to the reflector 32b"" associated with the area 16s. By analogy therewith, the unfolded beam is reflected by the elements 14a"" and 14b"" by means of the reflector 32c""'.

The transparent zones 16a and 16b are provided in the area 16s, whereas the opening 16c"" is provided within the area 16s"". As may already be seen by means of the transparent zones 16a and 16b, said transparent zones are located very close to each other, so that the associated detectors 18a and 18b are arranged almost directly next to each other. In order to sample a spectral component (wavelength) located between those spectral components which belong to the transparent zones 16a and 16b, either the beam is unfolded even more or, as is the case here, the emitted beam is duplicated, so that a spectral band is detectable between the two spectral bands of the transparent zones 16a and 16b by means of the opening 16c""'.

Since in accordance with embodiments, the two functional elements/gratings 14a"" and 14b"" belong together, the structure may be described, in other words, as follows. The grating 14a""+14b"" is configured such that the entry gap 12b"" is centrally provided within the grating 14a""+14b"", the light is converted to parallel beams via the oppositely located mirror 32a"", which parallel beams will then perpendicularly impinge upon the grating 14a""+14b"". This is important in order to be able to symmetrically evaluate the positive and negative diffraction order. However, symmetry is not mandatory.

In accordance with advantageous embodiments, both the transparent zones 16c"", 12b"" as well as the transparent zones 16a and 16b are arranged within the same substrate 16"". This is particularly advantageous since in this manner, the distances between the individual transparent zones 16a to 16c"" and 12b"" may be accurately positioned with regard to one another.

In accordance with further embodiments, the substrate 16"" as depicted here also includes the means for spectral unfolding, here the (planar) gratings 14a"" and 14b"" (either in combination with the exit gaps 16a, 16b and/or the entry gap 12b""). Also in this embodiment is it advantageous that the positioning of the gratings 14a" and 14b" with regard to the transparent zones 16a to 16c"" and/or 12b"" may be adjusted with very high accuracy.

In accordance with embodiments, a simple opening for radiation impinging from outside may be provided instead of the radiation source 12"".

It shall be noted at this point that in all of the embodiments of FIGS. 2a to 2c and of FIG. 3, the reflective faces 32a', 32b', 32b", 32a"", 32b"" and 32c"" are usually assumed to be parabolic mirrors configured to focus and image the beams, which have been spectrally unfolded by means of gratings, onto the corresponding substrates 16 and 16"", respectively. The mirrors 32a', 32b', 32b", 32a"", 32b"" and 32c"" may alternatively be configured to be planar, spherical, parabolic, biconical or as free-form surfaces; both concave and convex.

Figure 4:
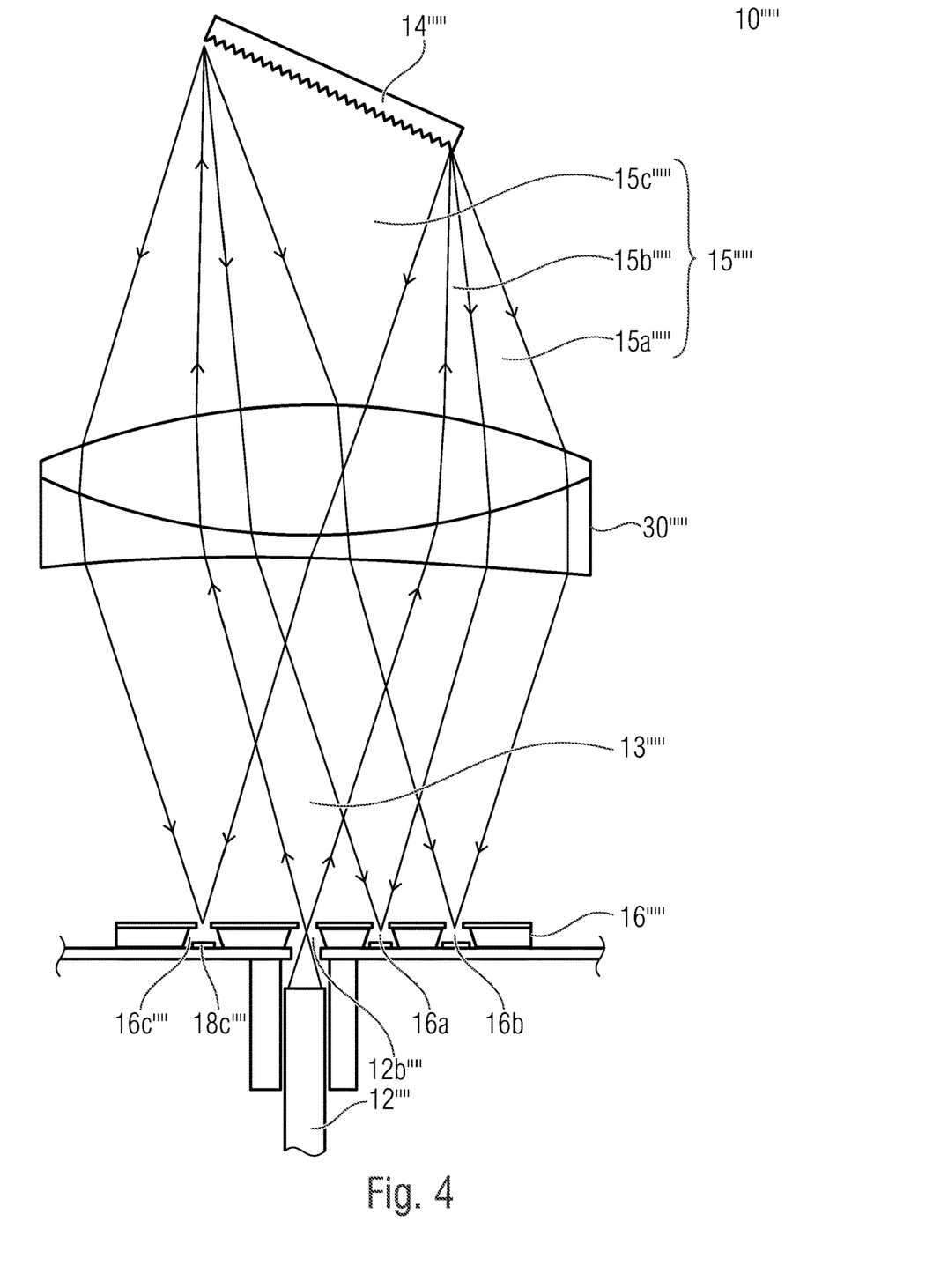
FIG. 4 shows a schematic representation of a polychromator comprising two projection areas and lens optics in accordance with an embodiment.

In the embodiment of FIG. 4, a lens element is used for focusing instead of the parabolic mirrors.

FIG. 4 shows a polychromator 10""' which includes a substrate 16""' having the transparent zones 16a, 16b, 12b"" as well as 16c"" provided therein. Again, the substrate 16""' includes exit gaps 16a, 16b and 16c"" plus entry gap 12b""'. The transparent zone 12b"" again is associated with an optional radiation source 12"", while the transparent zones 16a, 16b have the detectors 18a and 18b associated therewith, and the opening 12c"" has the detector 18"" associated therewith.

The element having a spectrally decomposing action 14""', here a grating implemented to be reflective, is provided opposite the substrate 16""'. In the intermediate area between the element having a spectrally decomposing action 14""' and the substrate 16""', a lens element 38""' is arranged which instead of the parabolic mirrors performs imaging (focusing) of the spectrum, which has been unfolded by means of the functional element 14""' (cf. 15""'), onto the substrate 16""'.

The mechanism which is operative in the examination, or the mode of operation, is comparable to the embodiments explained above, only the course of the beams is slightly changed. The beam 13"" is emitted by the source 12"" toward the element 14""' and is then reflected back in a spectrally decomposed manner (cf. 15""'). In the unfolded spectrum 15""', the three spectral components imaged onto the transparent zones 16a, 16b and 16c"" are marked by reference numerals 15a""', 15b""' and 15c""'.

It shall be noted at this point that in case a prism is used as a spectrally unfolding element, means for focusing will not necessarily be provided. As an alternative to the general grating or to the prism, the following optical (dispersive) elements may also be provided: transmission grating, reflection grating, blazed grating, echelle grating, echelette grating, planar grating, concave grating, convex grating, holographic grating, prism.

Even if the spectrally unfolding element has been described as an element acting upon reflection, spectral unfolding may alternatively also occur in transmission, in accordance with embodiments.

It shall also be noted at this point that in accordance with further embodiments, a system is provided. The system serves to analyze electromagnetic radiation and consists of at least the following:

- means which split up electromagnetic radiation into spectral constituents;
- further means which make electromagnetic radiation impinge upon the means for splitting up radiation, i.e. an entry opening limiting an aperture, a gap or the end of an optical fiber, or an optical waveguide;
- a device having a plurality of exit openings (well-defined spatial areas of different levels of radiation transmission, "diaphragms", "gaps");
- a plurality of means for detecting electromagnetic radiation;
- wherein electromagnetic radiation is deflected in different directions by the corresponding means for splitting up as a function of a spectral property;
- wherein electromagnetic radiation having different spectral properties is indirectly or directly detected after having passed exit openings;
- characterized in that at least two exit openings are produced in a shared substrate.

In accordance with embodiments, the system may comprise any of the following features:

- at least two exit openings of the device produced in the shared substrate, said exit openings corresponding to at least one spectral wavelength distance in terms of their locations, positions and/or mutual distances;
- at least two exit openings of the device produced in the shared substrate, said exit openings corresponding to selected spectral bands and/or spectral (atomic/molecular) transitions in terms of their locations, positions and/or mutual distances;
- the width of at least one exit opening correlates with the spectral width of a spectral band or of a spectral transition;
- the means for splitting up electromagnetic radiation into its spectral constituents are a periodic pattern, i.e. a "grating", which is provided as a transmission grating, reflection grating; said grating may be equipped with a so-called blaze for increasing intensity in a specific direction or wavelength; a so-called echelle or echelette grating is used; the grating is configured as a planar grating, a concave grating, a holographic grating; an at least approximately sinusoidal surface topology is used; or these means are a prism;
- the system contains at least one beam-forming element;
- the one beam-forming element and the means for splitting up electromagnetic radiation are implemented in one single device;
- the device having the at least two exit openings additionally has the (one) entry opening provided therein;
- the device having the at least two exit openings additionally contains the means for splitting up electromagnetic radiation into its constituents;
- the device having the at least two exit openings additionally comprises the (one) entry opening and the means for splitting up electromagnetic radiation into its constituents;
- the device contains a grating for splitting up electromagnetic radiation into its spectral constituents, which grating may be permanently tilted in terms of its location in relation to the remaining device, irrespective of whether said tilting is effected during installation or during subsequent adjustment;
- the exit openings are configured as gaps in that they are actual physical openings, or are configured as areas characterized by a spectral transmission characteristic which deviates from that of the surroundings; said exit openings are manufactured by means of an etching process or any other process of removing material, e.g. laser cutting or a (patterned) deposition method or a so-called lift-off method, i.e. two-dimensional deposition and local removal of a layer;
- at least two different detectors are employed which differ in particular with regard to their levels of sensitivity or the spectral distributions of sensitivity or the spectral detection ranges;
- the dimensions of the detectors with regard to the sum of the gap width and the deviation in adjustment, which is due to design-related reasons, are selected to be large enough to ensure that the intensity falling through the gap is detected by the detector;
- the device is made of silicon or any other semiconductor material;
- the device is manufactured of a substrate having a lateral structure comprising different material properties; e.g. an SOI or a BSOI substrate;
- the device is made from a substrate consisting of layers/sheets having different optical properties, e.g. from a chromium-on-glass substrate;
- the device is made from an organic material (plastic) or any other ductile material by means of molding or re-shaping, pressing, deep drawing, extruding, injecting or a related method;
- the device is manufactured such that a multitude of devices are manufactured at the same time and these are subsequently diced, e.g. manufacturing in a wafer compound and subsequent sawing;
- a grating is used which generates positive first-order diffraction and negative first-order diffraction, said diffractions are deflected into different spatial angles (directions) and are evaluated while using at least two inventive devices.

Therefore, this generally means that the system is characterized in that

- there are means which split up impinging electromagnetic radiation into spectral constituents in such a manner that different wavelengths are deflected into different spatial angles
- a plurality of means exist which detect the radiation intensity or a quantity associated therewith and convert it to an evaluable signal
- there are means which, on the basis of the intensity split up into different spatial angles, make at least two wavelength intervals impinge upon two different detection means by means of well-defined spatial areas of different radiation transmission (aperture diaphragms, gaps)
- the arrangement of said at least two spatial areas involves no separate adjustment, or is autonomously set by a manufacturing step/lithographic manufacturing step While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A polychromator comprising:
a substrate; and
a functional element performing an optical spectral decomposition action and spectrally decomposing electromagnetic radiation originating from an entry opening, a spectrally decomposed spectrum being achieved, and to direct the spectrally decomposed spectrum onto a spatial area of the substrate,
a first duplicator duplicating multiple components, including wavelengths, of the electromagnetic radiation, so that the multiple components of the duplicated electromagnetic radiation are imaged onto the spatial area of the substrate and onto a further spatial area of the substrate or of a further substrate;
wherein the substrate comprises at least two transparent zones at different positions within the spatial area, so that two different spectral components of the spectrum are detectable at the at least two transparent zones;
wherein at least one further transparent zone is provided within the further spatial area of the further substrate or of the substrate.

2. The polychromator as claimed in claim 1, wherein the at least two transparent zones have two detectors associated therewith.

3. The polychromator as claimed in claim 2, wherein the two detectors are larger than the diameters of the transparent zones.

4. The polychromator as claimed in claim 1, wherein the at least two transparent zones are spaced apart by a distance which corresponds at least to a spectral wavelength distance of two characteristic spectral components of a specific spectrum.

5. The polychromator as claimed in claim 1, wherein the distance is selected such that the characteristic spectral components of a specific spectrum are detectable.

6. The polychromator as claimed in claim 1, wherein the substrate comprises at least three transparent zones, and the polychromator comprises at least three detectors.

7. The polychromator as claimed in claim 1, wherein the at least two transparent zones are diaphragms or gaps.

8. The polychromator as claimed in claim 1, wherein the substrate comprises one part.

9. The polychromator as claimed in claim 1, wherein the functional element performing an optical spectral decomposition action comprises a prism, an element comprising a periodic pattern, and/or a grating.

10. The polychromator as claimed in claim 1, wherein the functional element performing an optical spectral decomposition action is operated in reflection or transmission.

11. The polychromator as claimed in claim 1, wherein the functional element performing an optical spectral decomposition action is arranged at an angle in relation to the substrate.

12. The polychromator as claimed in claim 1, wherein the entry opening is coupled to a radiation source, so that the electromagnetic radiation from the radiation source is coupled into the polychromator.

13. The polychromator as claimed in claim 12, wherein the entry opening comprises a beam former and/or a diaphragm.

14. The polychromator as claimed in claim 13, wherein the beam former is arranged at, and/or the diaphragm is arranged within, said one substrate.

15. The polychromator as claimed in claim 1, comprising further optical functional elements deflecting and/or focusing the electromagnetic radiation once is has been unfolded.

16. The polychromator as claimed in claim 1, comprising further optical functional elements reflecting and/or focusing the electromagnetic radiation before it is unfolded.

17. The polychromator as claimed in claim 1, comprising optics focusing the electromagnetic radiation once it has been unfolded.

18. The polychromator as claimed in claim 1, wherein the at least one further transparent zone is arranged within the same substrate as are the at least two transparent zones.

19. The polychromator as claimed in claim 18, wherein the radiation source and/or a beam former of a radiation source is arranged between the further transparent zone and the at least two transparent zones.

20. The polychromator as claimed in claim 1, wherein the at least one further transparent zone is associated with a wavelength ranging between the wavelengths associated with the at least two transparent zones.

21. The polychromator as claimed in claim 1, wherein the functional element performing an optical spectral decomposition action is arranged on or within the one substrate.

22. The polychromator as claimed in claim 1, wherein the substrate comprises different layers and/or different materials.

23. The polychromator as claimed in claim 1, said polychromator comprising different detectors.

24. The polychromator as claimed in claim 1, wherein the substrate is produced by means of lithography.

25. The polychromator as claimed in claim 1, wherein the further spatial area is spaced apart from the spatial area and/or separated from the spatial area.

26. The polychromator as claimed in claim 1, wherein an entry opening lies between the further spatial area and the spatial area.

27. A method of producing a polychromator comprising a substrate and a functional element as well as a first duplicator, wherein the functional element performs an optical spectral decomposition action spectrally decomposing electromagnetic radiation originating from an entry opening, a spectrally decomposed spectrum being achieved, and to direct the spectrally decomposed spectrum onto a spatial area of the substrate, wherein the first duplicator is duplicating multiple components, including wavelengths, of the electromagnetic radiation, so that the duplicated multiple components of electromagnetic radiation are imaged onto the spatial area of the substrate and onto a further spatial area of the substrate or of a further substrate, wherein at least one further transparent zone is provided within the further spatial area of the further substrate or of the substrate; the method comprising:
forming the substrate such that at least two transparent zones are at different positions, two different spectral components of the spectrum being detectable at the at least two transparent zones.

28. The method as claimed in claim 27, wherein forming of the substrate comprises lithography and/or laser cutting and/or etching.

29. The method as claimed in claim 27, wherein forming the substrate comprises dicing the substrate from a multitude of contiguous substrates.

30. A polychromator comprising:
- a substrate; and
- a functional element performing an optical spectral decomposition action and spectrally decomposing electromagnetic radiation originating from an entry opening, a spectrally decomposed spectrum being achieved, and to direct the spectrally decomposed spectrum onto a spatial area of the substrate,
- wherein the substrate comprises at least two transparent zones at different positions within the spatial area, so that two different spectral components of the spectrum are simultaneously detectable at the at least two transparent zones;
- at least two detectors arranged behind the at least two transparent zones, so depending on the spatial arrangement of said transparent zones different spectral bands and/or spectral components and/or spectral lines are examined.

\* \* \* \* \*